(12) United States Patent
Greco (10) Patent No.: US 11,719,532 B2
(45) Date of Patent: Aug. 8, 2023

(54) ELECTRONIC DEVICE AND METHOD FOR RECONSTRUCTING SHAPE OF A DEFORMABLE OBJECT FROM CAPTURED IMAGES

(71) Applicant: Sony Group Corporation, Tokyo (JP)

(72) Inventor: Tonino Greco, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 72 days.

(21) Appl. No.: 17/399,063

(22) Filed: Aug. 11, 2021

(65) Prior Publication Data
US 2022/0057195 A1    Feb. 24, 2022

(30) Foreign Application Priority Data
Aug. 18, 2020    (EP) .................................... 20191451

(51) Int. Cl.
| | | |
|---|---|---|
| *G01B 11/16* | (2006.01) | |
| *G01B 11/24* | (2006.01) | |
| *G01J 1/20* | (2006.01) | |

(52) U.S. Cl.
CPC .............. *G01B 11/24* (2013.01); *G01B 11/16* (2013.01); *G01J 1/20* (2013.01)

(58) Field of Classification Search
CPC ....... G01B 11/24; G01B 11/16; G01B 11/245; G01J 1/20; G06F 3/0304
See application file for complete search history.

(56) References Cited

U.S. PATENT DOCUMENTS

| | | | | |
|---|---|---|---|---|
| 7,636,169 | B2 * | 12/2009 | Elhagediab | G01B 11/16 356/614 |
| 2007/0279643 | A1 * | 12/2007 | Elhagediab | G01B 11/16 250/559.38 |
| 2009/0315989 | A1 * | 12/2009 | Adelson | G06F 3/03547 348/135 |
| 2011/0229013 | A1 * | 9/2011 | Huang | H04N 13/246 348/46 |
| 2014/0104395 | A1 * | 4/2014 | Rohaly | G01L 1/24 348/47 |
| 2015/0011894 | A1 * | 1/2015 | Sarrafzadeh | A61B 5/1102 600/476 |
| 2018/0188125 | A1 | 7/2018 | Park et al. | |
| 2019/0056248 | A1 | 2/2019 | Shepherd et al. | |
| 2019/0072378 | A1 * | 3/2019 | Hane | G01B 11/16 |
| 2022/0060676 | A1 * | 2/2022 | Scheller | H04N 13/254 |

FOREIGN PATENT DOCUMENTS

WO    2019/073424 A1    4/2019

OTHER PUBLICATIONS

Aggarwal et al., "Data Clustering Algorithms and Applications", Chapman & Hall / CRC Data Mining and Knowledge Discovery Series, 2014, 51 pages.

* cited by examiner

*Primary Examiner* — Roy M Punnoose
(74) *Attorney, Agent, or Firm* — Xsensus LLP (57) ABSTRACT

An electronic device comprising a deformable object which is at least partially filled with a light-absorbing material, one or more light sources configured to illuminate the inside of the deformable object, an imaging unit configured to capture respective images of the light sources, and circuitry configured to reconstruct the shape of the deformable object based on the captured images of the light sources.

18 Claims, 10 Drawing Sheets

Fig. 10

ELECTRONIC DEVICE AND METHOD FOR RECONSTRUCTING SHAPE OF A DEFORMABLE OBJECT FROM CAPTURED IMAGES

CROSS-REFERENCE TO RELATED APPLICATION

The present application claims priority to EP 20191451.2, filed Aug. 18, 2020, the entire contents of which is incorporated herein by reference.

TECHNICAL FIELD

The present disclosure generally pertains to the field of user interfaces for electronic devices, in particular to the field of flexible (or deformable) user interfaces.

TECHNICAL BACKGROUND

User interface devices such as handheld controllers are important in gaming applications, entertainment, soft robotics and many other technical fields. User interfaces are often designed in a rigid and/or unchangeable configuration.

There exist flexible user interface devices such as flexible displays. In human-computer interaction, such non-flat displays are also called organic user interfaces (OUI). In an organic user interface, the display surface may actively or passively change shape. There also exist organic user interfaces which are used as controllers to move or manipulate an object in three dimensions.

For recognition of a shape of an object distances and displacements may be measured. There are several existing technologies how distances and displacements are measured nowadays. For instance, optical sensors can be used to determine whether an object is present or not. Further, photoelectric switch devices can be used, wherein they can either be operated as transmissive types where the object being detected breaks a beam of light (for example infrared radiation) and thereby stops the beam of light of reaching a detector or photoelectric switch devices can be operated as reflective types where the object being detected reflects a beam of light onto the detector to be detected. The photoelectric switch devices may comprise a radiation emitter which may comprise a light-emitting diode (LED). The LED emits radiation which is reflected by the object and the reflected radiation may be detected by a radiation detector which can be a phototransistor or photodiode. If an object is present, there is reflected radiation to be detected and in the absence of any object there is no reflected radiation to be detected. Such sensors are used for sensing the presence of objects at close range, for example less than 5 mm.

Other technologies for measurements of deformations or displacements are proximity sensors that can be used with metallic and non-metallic objects, so-called capacitive proximity sensors. These capacitive proximity sensors are non-contact sensors which may comprise a probe which comprises a pair of parallel capacitor plates between which a potential difference is applied to produce an electric field. This field may be disturbed when it is moved close to an object. Thus, the proximity of the object is detected by a change in capacitance. Capacitive proximity sensors can also be used to detect a wide variety of non-metallic and metallic objects and may operate over a range of 3 to 30 mm. Still further, an inductivity proximity sensor may be used. An inductivity proximity sensor comprises a first coil to which an alternating current is applied to produce an alternating magnetic field which may be sensed by a sensing coil. When a metallic object is moved close to the first coil it may disturb the magnetic field and so the magnetic field detected by the sensing coil. Inductivity proximity sensors may be used to detect metallic objects for example up to 8 mm away.

In general, a normal camera sensor does not comprise depth information and thus 2D surface may not be distinguished from a 3D surface. A technology for measurement of distances and displacements are optical distance sensors, such as time-of-flight (ToF) sensors. ToF sensors measure a distance by computing the elapsed time between emitting a light signal and receiving it, wherein the emitted light may be emitted by a laser. If an object is measured which is for example less than 10 cm away from the sensor, the elapsed time between emitting and receiving the light signal is less than 1 microsecond.

All the above described technologies for measurement of distances and displacements may lack spatial resolution, depth information, or may be complicate and unreliable for a sensing ranges of several tens of centimeters, or they may be expansive. Therefore, it is desirable to provide methods and devices which provide an improved shape reconstructing of deformable objects.

SUMMARY

According to a first aspect the disclosure provides an electronic device comprising a deformable object which is at least partially filled with a light-absorbing material, one or more light sources configured to illuminate the inside of the deformable object, an imaging unit configured to capture respective images of the light sources, and circuitry configured to reconstruct the shape of the deformable object based on the captured images of the light sources.

According to a first aspect the disclosure provides a method comprising illuminating the inside of a deformable object which is at least partially filled with a light-absorbing material, capturing respective images of the light sources, and reconstructing the shape of the deformable object based on the captured images of the light sources.

Further aspects are set forth in the dependent claims, the following description and the drawings.

BRIEF DESCRIPTION OF THE DRAWINGS

Embodiments are explained by way of example with respect to the accompanying drawings, in which.

Before a detailed description of the embodiments under reference of FIGS. 1 to 10 is given, some general explanations are made.

The embodiments described below in more detail disclose an electronic device comprising a deformable object which is at least partially filled with a light-absorbing material, one or more light sources configured to illuminate the inside of the deformable object, an imaging unit configured to capture images of the light sources, and circuitry configured to reconstruct the shape of the deformable object based on the captured images of the light sources.

The electronic device may for example be used as a flexible user interface device whose outer shape can be changed. A recognition of the changed outer shape may be interesting, especially in gaming and entertainment, soft robotics and many other industry fields.

According to the embodiment it is possible to realize a deformable user interface device, which detects its deformation in real-time and subsequently reconstructs its shape deformation based on the captured images. Other methods for depth estimation like time-of-flight may be not suitable due to the short distances.

Circuitry may include a processor, a memory (RAM, ROM or the like), a DNN unit, a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.).

The circuitry may be configured to determine from the images respective positions of the light sources and to determine the shape of the deformable object based on the positions of the light sources.

The circuitry may be configured to determine an intensity of an image of a light source captured by an image sensor, and to determine a radial position of the light source based on the intensity.

The circuitry may be configured to determine a position shift related to a light source based on the intensity of the image of the light source.

The circuitry may be configured to determine an extinction value based on the intensity of the image of the light source, and to determine the position shift based on the extinction value.

The circuitry may be configured to determine the extinction value based on an intensity of the image of the light source, and a reference intensity.

The light-absorbing material comprises a light-absorbing dye distributed within the deformable object, and wherein the circuitry is configured to determine a radial position shift of the light source based on the intensity of the image of the light source, and based on a molar attenuation coefficient of a light-absorbing dye, and a concentration of a light-absorbing dye distributed within the deformable object.

The circuitry may be configured to determine the radial position of the light source based on the position shift and a reference position.

The circuitry may be configured to determine a position of an image of a light source on an image sensor and to determine a direction of the light source based on this position.

The light sources may be embedded in the deformable object.

The circuitry may be configured to reconstruct the shape of the object by reconstructing a 3D position for each of the light sources.

The circuitry may be configured to reconstruct a shape of the object based on an interpolation through positions of the light sources.

The imaging unit may be located inside the object.

The imaging unit may comprise a plurality of camera sensors and lens systems to capture a 360° angle of view.

The light sources may be placed at the inner side of an outer part of the object.

The light sources may be placed inside the object to illuminate a reflective layer of the deformable object.

The light sources may be LEDs.

According to an embodiment, an interior part of the deformable object comprises a non-scattering, flexible, elastic and/or non-compressible polymer in combination with a homogeneously dissolved light-absorbing dye.

According to an embodiment, the outer part of the object comprises a flexible, stretchable and/or plastic material.

The embodiments also relate to a method comprising illuminating the inside of a deformable object which is at least partially filled with a light-absorbing material, capturing respective images (C) of the light sources, and reconstructing the shape of the deformable object based on the captured image of the light sources.

The embodiments also relate to a computer-implemented method which comprises reconstructing the shape of the deformable object based on captured images of light sources.

Embodiments are now described by reference to the drawings.

DETAILED DESCRIPTION OF EMBODIMENTS

Figure 1:
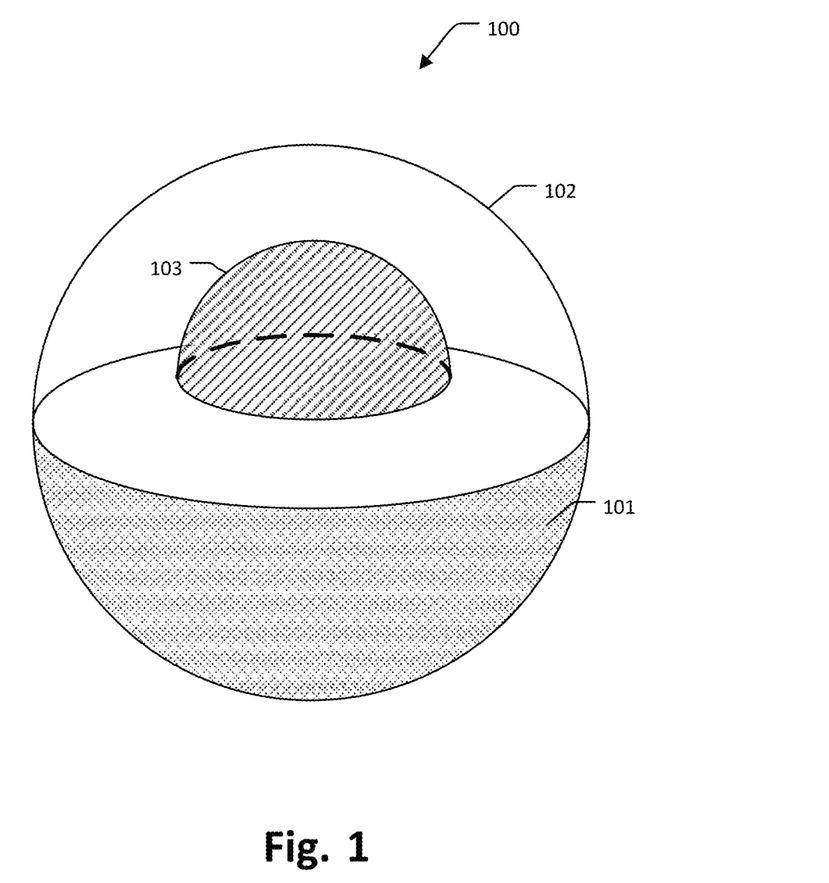
FIG. 1 schematically shows a deformable object with optical shape recognition.

FIG. 1 schematically shows a deformable object with optical shape recognition. A deformable object 100 comprises an interior part 101 (body) which consists of a non-scattering, flexible or elastic/viscoelastic non-compressible polymer in combination with a homogeneously dissolved light-absorbing dye, i.e. the interior part 101 is a dye-polymer composite. The interior part 101 has a predetermined light absorption band, for example in the visible or even near infrared spectral range. The deformable object 100 further comprises an outer part 102 which determines the shape of the deformable object 100 and which is a flexible, stretchable, plastic protection skin of the deformable object 100. In one embodiment (see FIG. 3) at the inner side of the outer part 102 a reflective layer may be attached. In another embodiment (see FIG. 2) at the inner side of the outer part 102 one or more light sources may be attached which illuminate the interior part 101 of the deformable object. The deformable object 100 further comprises an imaging and processing unit 103 for optical shape recognition which is placed in inside (for example in the center) of the deformable object 100. The imaging and processing unit 103 may have a spherical shape or a polyhedron shape or the like. The imaging and processing unit 103 comprises an imaging system which is able to capture one or more images with a full 360° angle of view (i.e. of the of inner side of the outer part 102 of the deformable object). The imaging and processing unit 103 further comprises a processing unit which controls the imaging process and processes the collected data. In one embodiment the imaging and processing unit 103 may further comprise a light source which may illuminate a reflective layer attached to the inner side of the outer part 102.

The non-scattering, flexible or elastic/viscoelastic non-compressible polymer of the interior part 101 may be transparent (in which case the light absorption is done only by the dye). The viscoelastic silicone polymer may be made of polydimethylsiloxane crosslinked with boric acid in various ratios and additives.

Light which is emitted by a light source attached to the inner side of the outer part 102 or light that is emitted by a light source in the imaging and processing unit 103 is captured by the imaging system in the imaging and processing unit 103. The light-absorbing dye which is homogeneously dissolved in the interior part 101 of the deformable object 100 and gradually absorbs the light and thus decreases its intensity. Based on the decreased intensity the travelled distance of the light (depth information) is determined and a shape of the deformable object is determined. Thereby a real-time detection of the deforming and a shape recognition of the deformable object 100 can be realized.

The deformable object 100 with optical shape recognition may be used as a user interface device, for example as a controller for gaming applications or may be used for robotics applications. The deformable object 100 may have any default shape, like a sphere, a cube, a polyhedron or the like.

The light-absorbing dye may belong to one of the following dye classes: Zinc chlorines and their free base chlorine form (absorption maxima from ~600 to ~700 nm), zinc or free-base chlorin-imides (absorption maxima from ~650 to ~720 nm), zinc or free-base bacteriochlorins (absorption maxima from ~700 to ~800 nm), and zinc or free-base bacteriochlorin-imides (absorption maxima from ~780 to ~850 nm). Still further, other NIR-active dyes are classified as phthalocyanines, cyanine dyes and squaraine dyes.

The flexible, plastic outer part 102 may be made of an elastic polymer like silicone rubber or natural rubber.

Figure 2:
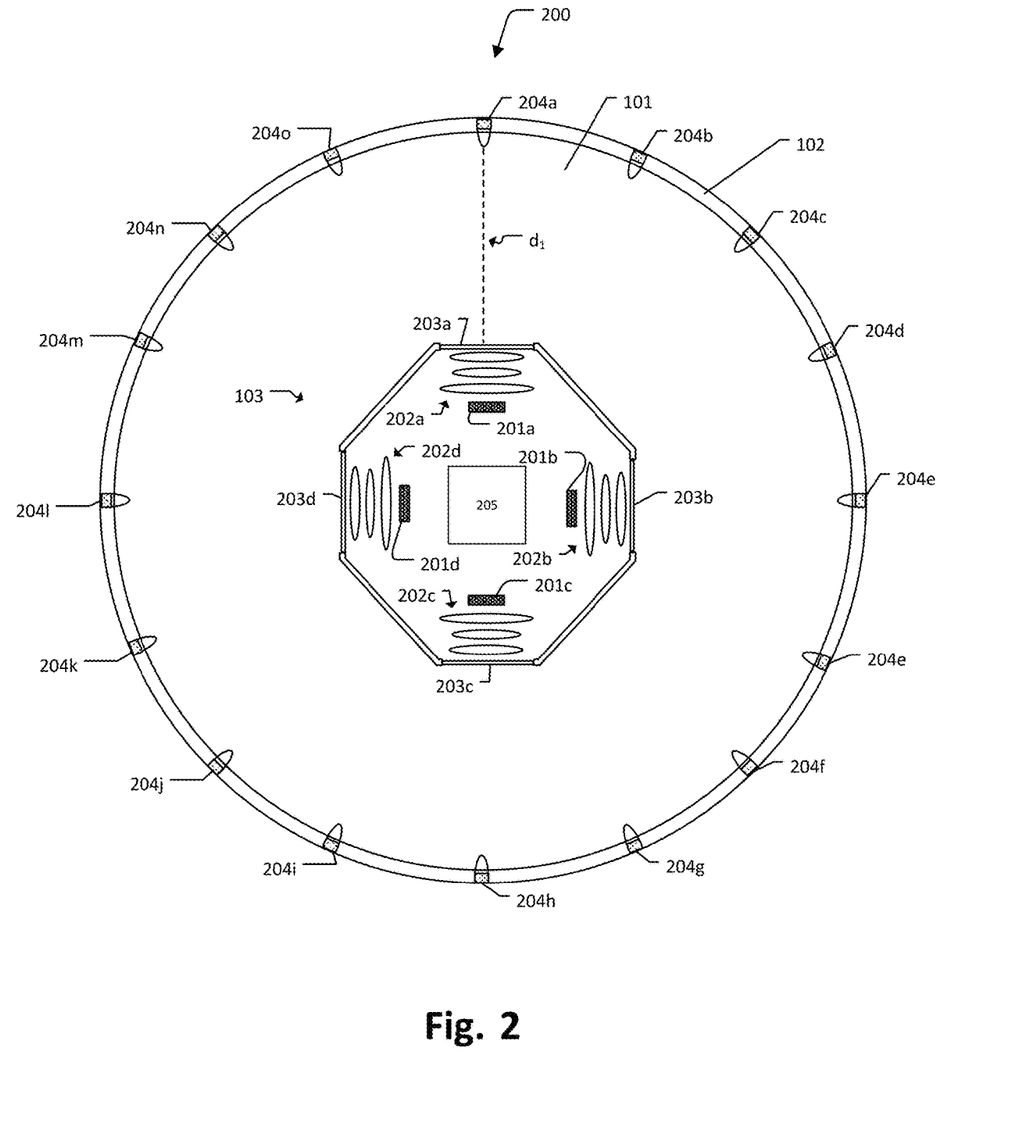
FIG. 2 schematically shows a cross-section of a first embodiment of a deformable object.

FIG. 2 schematically shows a cross-section of a first embodiment of a deformable object 100. The cross section 200 of the deformable object 100 is a cross section through the x-z-plane. The cross section 200 schematically shows a flexible, plastic outer part 102 which forms a spherical default shape of the deformable object, and an interior part 101 consisting of an elastic non-compressible polymer in combination with a homogeneously dissolved light-absorbing dye. At the inner surface of the outer part 102 a plurality of LEDs 204a-204o (a flexible LED array) is homogeneously spaced to illuminate the interior part 101. The LEDs 204a-204o may emit light in visible or near-infrared (NIR) wavelength range. The emission characteristics of the LEDs 204a-204o may be adjusted to the characteristics of the employed homogeneously dissolved light-absorbing dye (for example the molar attenuation coefficient of the dye) in the interior part 101 of the deformable object. The cross section 200 further shows an embodiment of an imaging and processing unit 103 placed in inside the deformable object 100. The imaging and processing unit 103 comprises four camera sensors (for example CMOS sensors) 201a-201d with corresponding lens systems (objectives) 202a-202d. The camera sensor 201a and its corresponding lens system 202a is oriented along the positive z-axis (i.e. upwards); the camera sensor 201b and its corresponding lens system 202b is oriented along the positive x-axis (i.e. to the right); camera sensor 201c and its corresponding lens system 202c is oriented along the negative z-axis (i.e. downwards); camera sensor 201d and its corresponding lens system 202d is oriented along the negative x-axis (i.e. to the left). Each of the lens systems 202a-202d have at least an angle of view of 90° centered around their middle axis. Still further, respectively a camera sensor with corresponding lens system (at least an angle of view of 90°) is placed in direction of the positive y-axis and in direction of the negative y-axis (both not shown in FIG. 2).

With this described setup of camera sensors and lens systems a full 360° angle of view of the space surrounding the imaging and processing unit 103 can be captured. The lens systems 202a-202d are respectively protected by transparent protection layers 203a-203d, which may for example be made of glass. Data collected by the camera sensors 201a-201d is sent to a processing unit 205 via an interface (for example Camera Serial Interface) to be further processed. The processing unit 205 may comprise a wireless interface like Bluetooth or wireless LAN to send data to an outside processor. The distance $d_1$ indicates the distance between the LED 204a and the transparent protection layer 203a (correspondingly a distance between each transparent detection layer and the corresponding LED which illuminates it can be measured). The distance $d_1$ is the mean travelled distance of all light beams emitted by the LED 204a and captured by the camera sensor 201a. The LED 204a emits light in several directions (for example 45°). This light is focused on the camera sensor 201 by the lens system 202a where its intensity is measure (see below). It may be assumed that the distance $d_1$ is the distance from the LED 204a through the centre of the lens system 202a to the camera sensor 201a. This may for example be ensured by a calibration process (see below).

The LED 204a emits light with a predetermined emission intensity $I_0$ (for example predetermined by calibration). The camera sensor 201a captures an image of the LED 204a by detecting the light that is emitted by the LED 204a and a measured intensity $I_1$ on the camera sensor 201a can be determined. The light emitted by the LED 204a has travelled the distance $d_1$ between the LED and the transparent protection layer 204a trough the interior part 101 which consists of an elastic non-compressible polymer in combination with a homogeneously dissolved light-absorbing dye. The light which is emitted by the LED 204a is gradually absorbed by the homogeneously dissolved light-absorbing dye and thereby the emission intensity $I_0$ decreases along the distance $d_1$ to the measured intensity $I_1$ on the camera sensor. The amount of light absorption and therefore the loss of intensity is depending on a molar attenuation coefficient of the dye and the distance $d_1$. Based on the measured intensity $I_1$ and the Lambert-Beer law the a position shift may of a light source be determined (see FIG. 8 and the corresponding description).

The same principle can be applied for all LEDs. By determining the coordinates of the plurality of LEDs 204a-204o the shape of the object 100 may be reconstructed. The shape of the object 100 may for example be reconstructed by providing a set of coordinates (for example in 3D global coordinates) of a plurality of LEDs 204a-204o which are homogeneously spaced around the inner surface of the outer part 102 the deformable object 100.

The measured light intensity translates to a voltage. However, instead of the light intensity also the irradiance could be to measure, which would measure the light power per unit square like W/cm2. The term "irradiance" of a light beam may refer to what amount of energy arrives on a certain surface with a given orientation and intensity of a light beam may be defined as the amount of energy going through an area perpendicular to the beam.

For the detection of a deformation of the object, a shape reconstruction may be applied in real-time by constantly sending out light by the LEDs and measuring the distance of the LEDs based on the principle explained above.

The location of the LEDs in FIG. 2 is to be understood schematically. More or less LEDs than shown in FIG. 2 may be placed around the inner side of the outer part 102 of the deformable object. The LEDs in general homogeneously illuminate the imaging and processing unit 103.

In the embodiment of FIG. 2, the camera sensors with their corresponding lens systems are arranged at the six faces of a cube. However, in another embodiment the camera sensors with their corresponding lens systems may for example be arranged at the 8 faces of a octahedron (i.e. 8 camera and lens systems) or the 12 faces of Dodecahedron (i.e. 12 camera and lens systems) or at the faces of any other polyhedron or along the surface of another geometric shape. In another embodiment there may be used less than 6 camera sensors for example 2, 3 or 4 camera sensors with corresponding lens systems. The camera sensors with their corresponding lens systems may always be arrange such that the full 360° view around the imaging and processing unit 103 is captured by the camera sensors with their corresponding lenses. In another embodiment a photoresistor array, or photodiodes may be used instead of then camera sensors.

Figure 3:
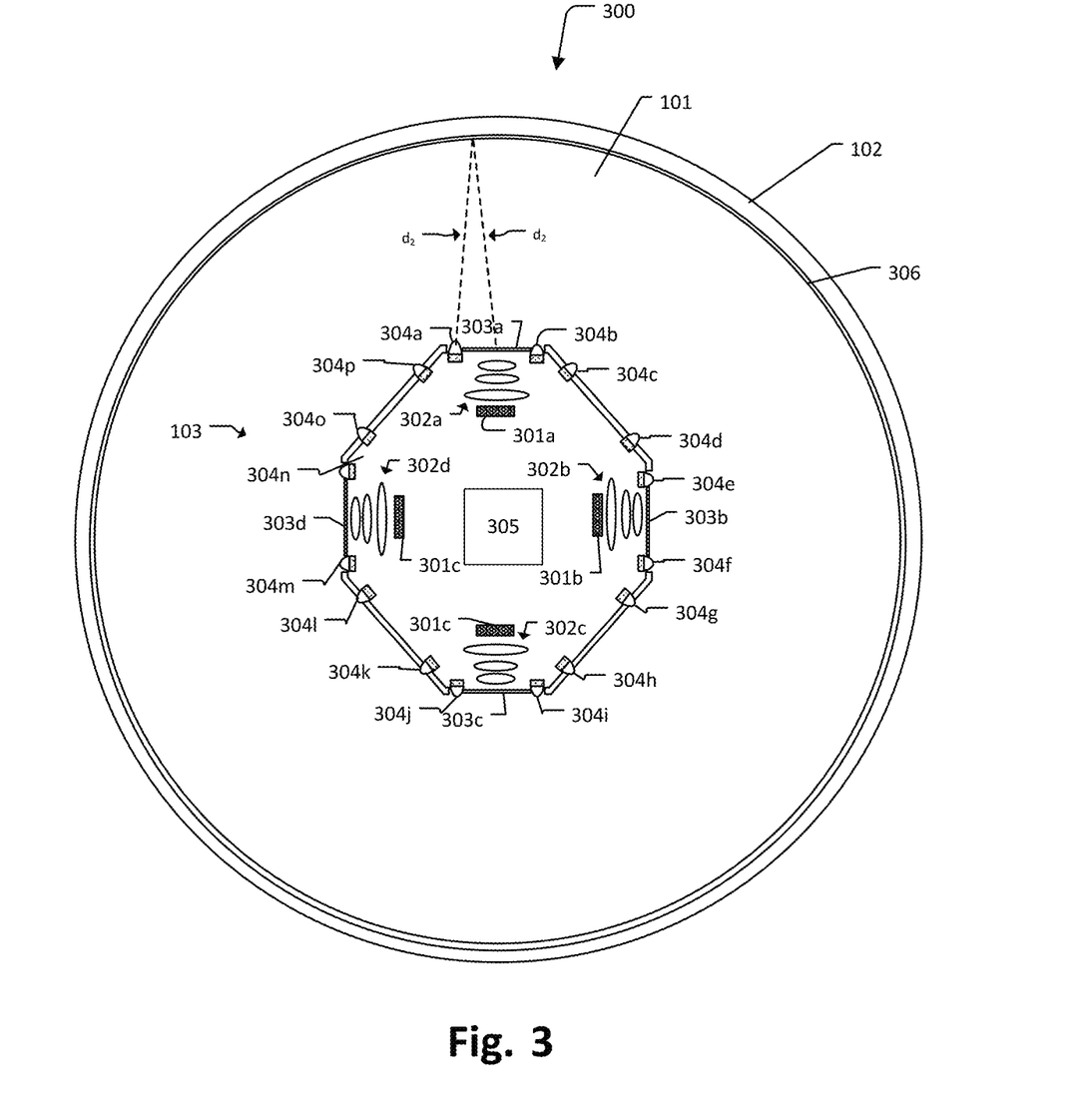
FIG. 3 schematically shows a cross-section of a second embodiment of a deformable user interface device with optical shape recognition.

FIG. 3 schematically shows a cross-section of a second embodiment of a deformable user interface device with optical shape recognition. The cross section 300 of the deformable object 100 is a cross section through the x-z-plane. The cross section 300 schematically shows a flexible, plastic outer part 102 which forms a spherical default shape of the deformable object 100, and an interior part 101 consisting of an elastic non-compressible polymer in combination with a homogeneously dissolved light-absorbing dye. At the inner surface of the outer part 102 a reflective layer 306 is attached, for example a layer of aluminum foil. The cross section 200 further shows an embodiment of an imaging and processing unit 103 placed inside the deformable object 100. The imaging and processing unit 103 comprises four camera sensors (for example CMOS sensors) 301a-301d with corresponding lens systems (objectives) 302a-302d. The camera sensor 301a and its corresponding lens system 302a is oriented along the positive z-axis (i.e. upwards); the camera sensor 301b and its corresponding lens system 302b is oriented along the positive x-axis (i.e. to the right); camera sensor 301c and its corresponding lens system 302c is oriented along the negative z-axis (i.e. downwards); camera sensor 301d and its corresponding lens system 302d is oriented along the negative x-axis (i.e. to the left). Each of the lens systems 302a-302d have at least an angle of view of 90° centered around their middle axis. Still further, respectively a camera sensor with corresponding lens system (at least an angle of view of 90°) is placed in direction of the positive y-axis and in direction of the negative y-axis (both not shown in FIG. 2). With this described setup of camera sensors and lens systems a full 360° angle of view of the space surrounding the imaging and processing unit 103 can be captured. The lens systems 302a-202d are respectively protected by transparent protection layers 303a-303d, which may for example be made of glass. Still further, a plurality of LEDs 303a-303p are placed homogeneously around the surface of the imaging system and light source unit 103 (besides on the transparent protection layers 303a-303d no LEDs are placed) to illuminate a full 360° angle of view surrounding the imaging system and light source unit 103 and illuminating the reflective layer 306. The LEDs 304a-304p may emit light in visible or near-infrared (NIR) wavelength range. The emission characteristics of the LEDs 304a-304p may be adjusted to the characteristics of the employed homogeneously dissolved light-absorbing dye (for example the molar attenuation coefficient of the dye) in the interior part 101 of the deformable object. Data collected by the camera sensors 301a-301d is sent to a processing unit 305 via an interface (for example Camera Serial Interface) to be further processed. The processing unit 305 may comprise a wireless interface like Bluetooth or wireless LAN to send data to an outside processor. The distance $d_2$ indicates a distance of a light beam travelling from the LED 304a to the reflective layer 306 and reflected from there to the transparent protection layer 303a. The size of the imaging and processing unit 103 may be small compared to the radius of the object 100 and therefore it may be assumed that the distance $d_2$ between the light emitting LED 304a and the reflection point of the LED 304a at the reflective layer 306 is the same distance as the distance between the reflection point of the LED 304a at the reflective layer 306 and the point where the reflected light beam hits the transparent protection layer 303a (over the camera sensor 301a where the light beam is captured). The LED 304a emits light in an several directions (for example 45°) to the reflective layer 306 and the reflective layer reflects the received light from the LED in several directions and to the lens system 302a which focuses the light to the camera sensor 301a where its intensity is measured (see below). It may be assumed that the distance $d_2$ is the distance from the reflection point at the reflective layer 306 of the LED 304a through the centre of the lens system 302a to the camera sensor 301a. This may be ensured by a calibration process (see below).

The LED 304a emits light with a predetermined (for example predetermined by calibration) emission intensity $I_0$. The camera sensor 301a captures an image of the LED 304a by detecting the light that is emitted by the LED 304a and reflected by the reflective layer 306 and a measured intensity $I_1$ on the camera sensor 301a can be determined. The light emitted by the LED 304a has travelled the distance $2d_2$ between the LED, the reflective layer 306 and the transparent protection layer 304a trough the interior part 101 which consists of an elastic non-compressible polymer in combination with a homogeneously dissolved light-absorbing dye. The light which was emitted by the LED 304a light was gradually absorbed by the homogeneously dissolved light-absorbing dye and thereby the emission intensity $I_0$ decreased along the distance $2d_2$ to the measured intensity $I_1$ on the camera sensor 301a. The amount of light absorption and therefore the loss of intensity is depending on a molar attenuation coefficient of the dye and the distance $2d_2$. Based on the measured intensity $I_1$ and the Lambert-Beer law the distance $d_2$ may be determined, and the coordinates of the the reflection point of the LED 304a at the reflective layer 306 may be determined. The distance between the transparent protection layer 304a and the camera sensor 301a may be small and neglectable compared to the distance d and the light absorption loss of intensity occurring at the distance between the transparent protection layer 304a and the camera sensor 301a may be small and neglectable because the material along this way (i.e. the material of the lens system 302a for example glass and the air between the elements 301a, 302a and 303a) may have a very low light absorption characteristic.

The same principle can be applied for all LEDs. By determining the coordinates of the plurality of reflection points of the plurality of LEDs 304a-p at the reflective layer 306, a shape of the deformable object 100 may be reconstructed. The shape of the object may be reconstructed by stating a set of coordinates (for example in 3D global coordinates) of a plurality reflection points of the plurality of LEDs 304a-p at the reflective layer 306 (which is attached to the inner surface of the outer part 102 the deformable object 100).

The detection of a deformation of the object a shape reconstruction may be applied in real-time by constantly sending out light by the LEDs and measuring the distance of the LEDs based in the principle explained above.

The location of the LEDs in FIG. 3 is to be understood schematically. More or less LEDs than shown in FIG. 3 may be placed around the imaging and processing unit 103.

In the embodiment of FIG. 3 the camera sensors with their corresponding lens systems are arranged at the six faces of a cube. However, in another embodiment the camera sensors with their corresponding lens systems may for example be arranged at the 8 faces of a octahedron (i.e. 8 camera and lens systems) or the 12 faces of Dodecahedron (i.e. 12 camera and lens systems) or at the faces of any other polyhedron or along the surface of another geometric shape. In yet another embodiment there may be used less than 6 camera sensors for example 2, 3 or 4 camera sensors with corresponding lens systems. The camera sensors with their corresponding lens systems may always be arrange such that the full 360° view around the imaging and processing unit 103 is captured by the camera sensors with their corresponding lenses. In another embodiment a photoresistor array, or photodiodes may be used instead of then camera sensors.

Figure 4:
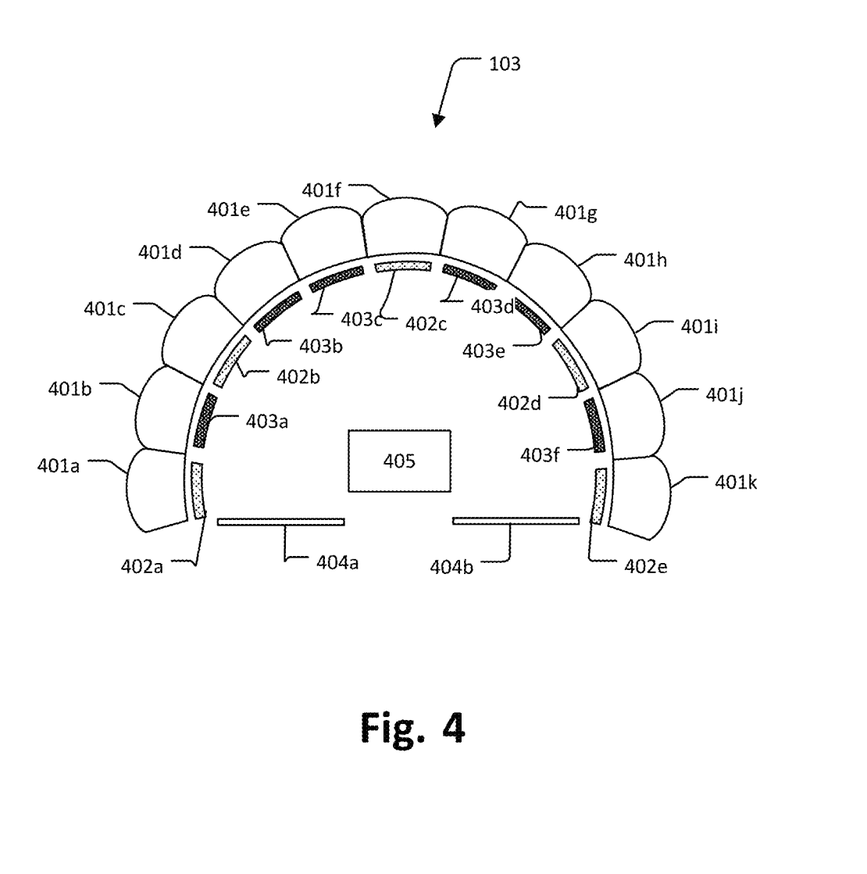
FIG. 4 schematically shows a cross-section of a second embodiment imaging and processing unit 103.

FIG. 4 schematically shows a cross-section of an imaging and processing unit 103 according to a second embodiment. The cross section of the imaging and processing unit 103, is a cross section through the x-z-plane and shows the upper hemisphere of a spherically shaped imaging and processing unit 103. It comprises a micro lens array 501, which comprises the micro lenses 401a-401j, which are arranged alongside of a spherical surface of a spherical imaging system with light sources. Under micro-lenses 401b, 401d, 401e, 401g, 401h and 401j photodiodes 403a-403f are arranged. The micro-lenses 401b, 401d, 401e, 401g, 401h and 401j may have such an angle of view that the upper hemisphere of the imaging system and light source unit 103 captures 180° of the complete upper hemisphere, for example each micro lens has an angle of view of 45°. The micro-lenses and photodiodes are arranged homogeneously around the upper hemisphere of the imaging and processing unit 103. The lower hemisphere of the imaging and processing unit 103 is symmetrical to the upper hemisphere of the imaging and processing unit 103. Together, the upper and the lower hemisphere of the spherically shaped imaging and processing unit 103 capture a full 360° angle of view of the space surrounding the imaging and processing unit 103. Under micro lenses 401a, 401c, 401f, 401i and 401k micro LEDs 403a-403e are placed. The micro lenses 401a, 401c, 401f, 401i and 401k may have other optical properties as the micro lenses 401b, 401d, 401e, 401g, 401h and 401j. For example, the micro lenses 401a, 401c, 401f, 401i and 401k may defocus the light from the micro LEDs 403a-403e in a wide angle, for example 120°. Two micro lenses with the corresponding micro LEDs are placed at the equator along the x axis, i.e. 401a with 402a and 402e with 401k. Two micro lenses with the corresponding micro LEDs are placed correspondingly along the at the equator along the y axis (not shown in FIG. 4). The micro lenses with the corresponding micro LEDs around the equator are placed such that they symmetrically illuminate a part of the upper hemisphere as well as a part of the lower hemisphere. Still further, two micro lenses with the corresponding micro LEDs are placed at circa 45° along the x axis, i.e. 401c with 402b and 402d with 401i. Two micro lenses with the corresponding micro LEDs are placed correspondingly at circa 45° along the y axis (not shown in FIG. 4). The micro LEDs arranged in the upper hemisphere of the imaging system and light source unit 103 as shown in FIG. 4 together with a symmetrically arranged micro LEDs in a lower hemisphere of the imaging system and light source unit 103 illuminate a full 360° space surrounding the imaging system and light source unit 103. The photodiodes 403a-403f process incoming light and transmit it via interfaces 404a, 404b (for example CSI interfaces) to a processing unit 405 to be further processed. The processing unit 405 may comprise a wireless interface like Bluetooth or wireless LAN to send data to an outside processor.

The imaging and processing unit 103 which is described with regard to FIG. 4 may be placed inside object as described with regard to FIG. 3.

The hemispherical imaging system as described in FIG. 4 is described in more detail in the scientific paper "Digital cameras with designs inspired by the arthropod eye", by Song, Young Min, et al., published in Nature 497.7447 (2013): 95-99.

The drawings of FIG. 4 are to be understood schematically, and the micro LEDs with corresponding micro lenses may for example only occupy 1/10 or 1/5 of the space that is occupied the photodiodes corresponding micro lenses.

In another embodiment under micro-lenses 401b, 401d, 401e, 401g, 401h and 401j instead of photodiodes 403a-403f, full camera sensors (for example CMOS sensors) may be placed.

Figure 5:
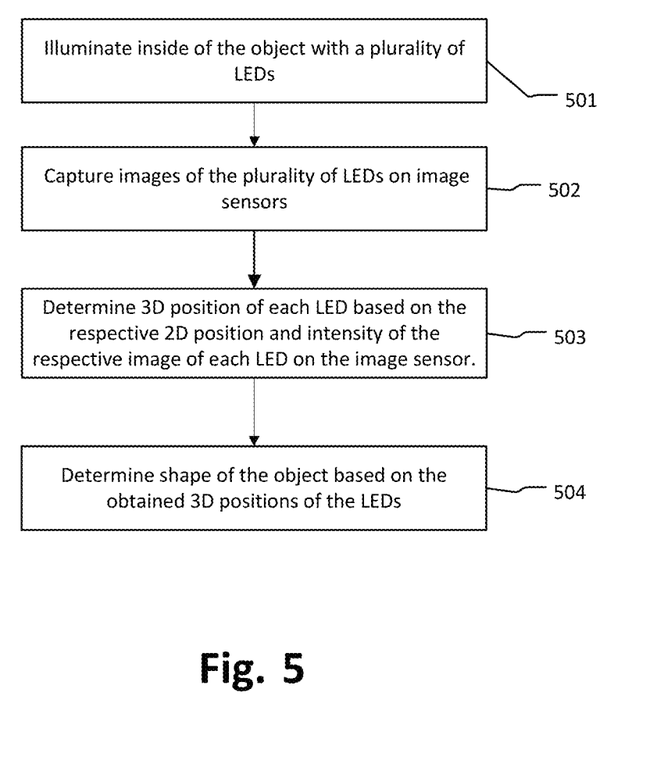
FIG. 5 shows a flowchart of a process of optical shape recognition of a deformable object.
Figure 7:
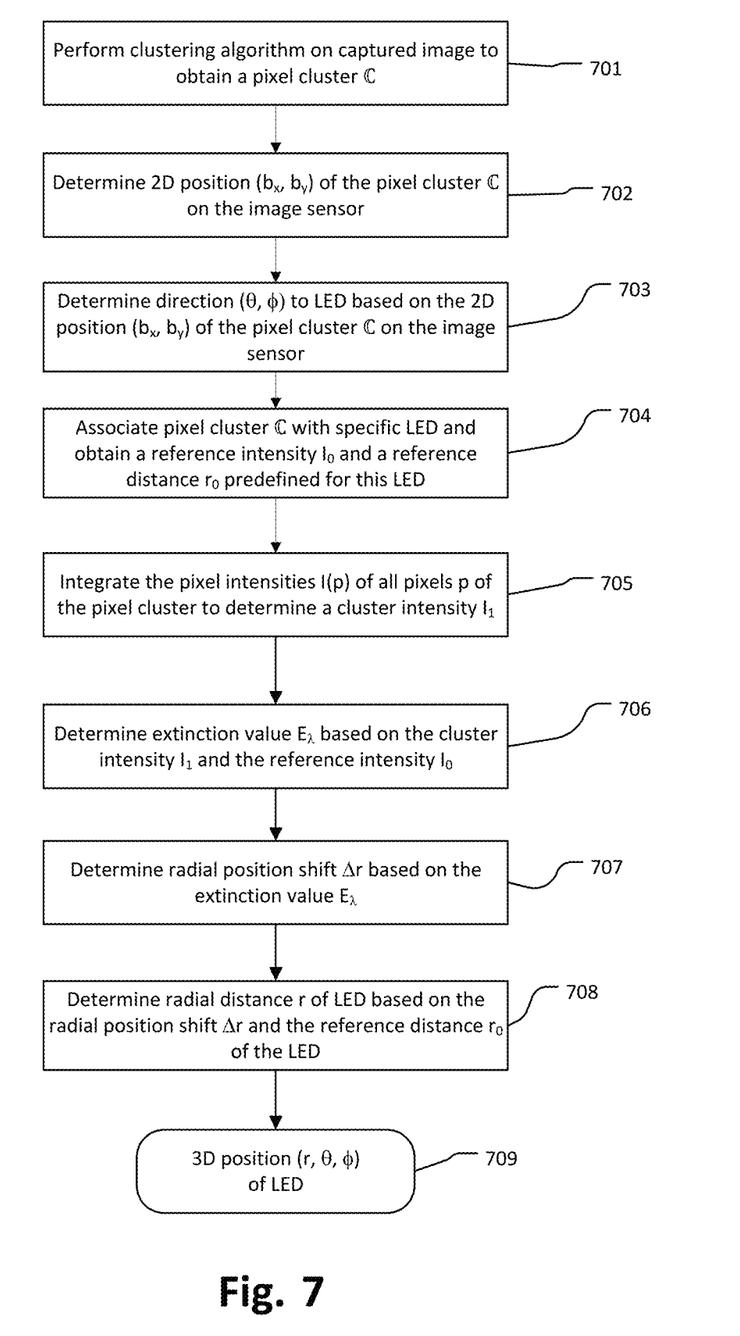
FIG. 7 show in more detail an embodiment of determining a 3D position of an LED based on the 2D position and intensity of a pixel cluster on the image sensor that is related to the LED, such as performed in step 504 of FIG. 5.
Figure 8:
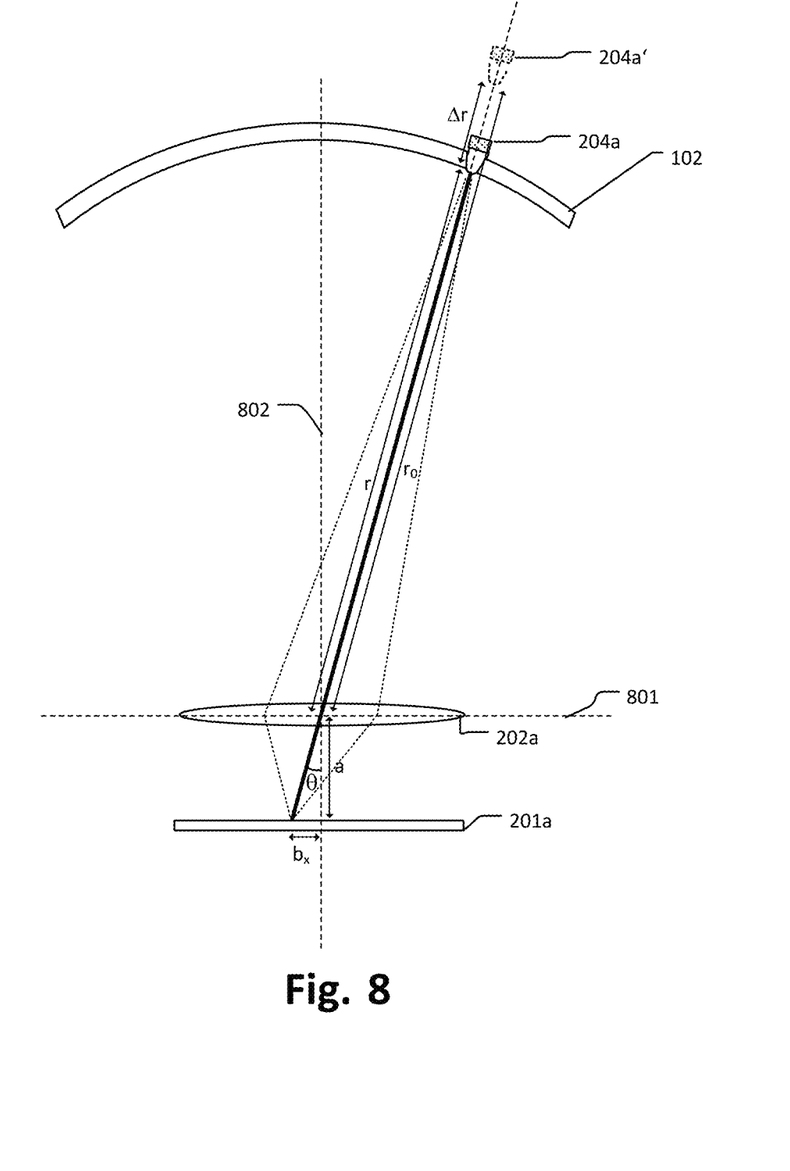
FIG. 8 schematically shows a path of a light beam travelling within the light-absorbing interior part of the deformable object 100 of FIG. 2.

FIG. 5 shows a flowchart of a process of optical shape recognition of a deformable object. At 501, the inside of object 100 is illuminate with a plurality of LEDs. At 502, images of the plurality of LEDs are captured on image sensors. At 503, the 3D position of each LED is determined based on the 2D position and intensity of a respective image of the LEDs on the image sensor. At 503, the shape of the object 100 is determined based on the obtained 3D positions of the LEDs FIGS. 6, 7 and 8 show in more detail an embodiment of a process of determining a 3D position of a LED based on the respective 2D position and intensity of the image of the LED on an image sensor.

Figure 6:
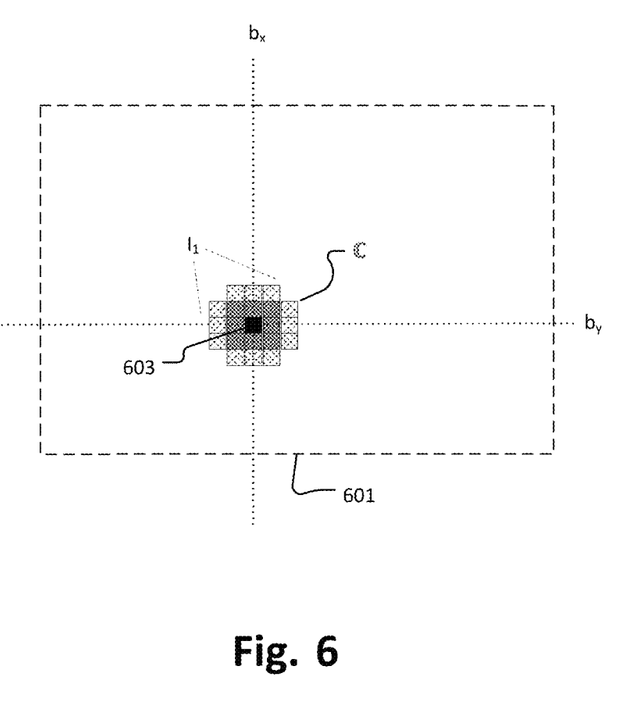
FIG. 6 schematically shows an embodiment of a process of determining a 2D position and intensity of a pixel cluster which corresponds to an image of an LED on an image sensor.

As shown in FIG. 6, the image 601 captured by a camera (for example taken by the camera sensor 301a) consists of individual pixels according to the resolution and colour depth of the camera sensor. A clustering process identifies in a captured camera image 601 a cluster $\mathbb{C}$ of pixels that are illuminated by light emerging from the same LED (204a-204o in FIG. 2). The clustering process may comprise any techniques of cluster analysis known to the skilled person, i.e. any technique for grouping a set of pixels in such a way that pixels in the same group (called a cluster) are more similar (here with regard to their position on the camera sensor) to each other than to those in other groups (clusters). For example a centroid-based clustering algorithm such as a k-means algorithm may be applied to identify pixel clusters such as described by Charu C. Aggarwal, Chandan K. Reddy in "Data Clustering", Springer, August 2013, ISBN 9781466558229 3. Any other techniques such as connectivity-based clustering (hierarchical clustering), distributionbased clustering, density-based clustering, or grid-based clustering may as well be applied in addition or alternatively.

For sake of clarity, only one pixel cluster $\mathbb{C}$ is shown in FIG. 6. In a practical example, an image sensor will capture a respective cluster of pixels for each LED within the field of view of the sensor.

By integrating the pixel intensities I(p) of all pixels p belonging to the pixel cluster $\mathbb{C}$, a cluster intensity $I_1$ related to cluster $\mathbb{C}$ is obtained:

$$I_1 = \sum_{p \in \mathbb{C}} I(p)$$

This cluster intensity $I_1$ reflects the amount of light that is collected on the camera sensor and that originates from the LED.

A 2D position ($b_x$, $b_y$) of the pixel cluster $\mathbb{C}$ on the captured camera image 601 is obtained by determining for example the centre of mass (with regard to the intensity) of the positions ($x_p$, $y_p$) of all pixels p in the cluster $\mathbb{C}$:

$$(b_x, b_y) = 1/I_1 \sum_{p \in \mathbb{C}} (x(p), y(p)) I(p)$$

As an alternative to the centre of mass (with regard to the intensity), the centroid (geometric center) may be determined to determine position ($b_x$, $b_y$) of the pixel cluster $\mathbb{C}$.

FIG. 7 shows in more detail an embodiment of a process for determining a 3D position of an LED based on the 2D position and intensity of a pixel cluster on the image sensor that is related to the LED, such as performed in step 504 of FIG. 5. At 701, a clustering algorithm is performed on a captured image to obtain a pixel cluster $\mathbb{C}$. At 702, a 2D position ($b_x$, $b_y$) of the pixel cluster $\mathbb{C}$ on the image sensor is determined. At 703, a direction (θ, φ) to the LED is determined based on the 2D position ($b_x$, $b_y$) of the pixel cluster $\mathbb{C}$ on the image sensor. At 704, the pixel cluster $\mathbb{C}$ is associated with a specific LED and a reference intensity $I_0$ an a reference distance $r_0$ predefined for this LED is obtained. At 705, the pixel intensities I(p) of all pixels p of the pixel cluster are integrated to determine a cluster intensity $I_1$. At 706, an extinction value $E_\lambda$ of the LED light on the way from the LED, through the light-absorbing dye to the image sensor is determined based on the cluster intensity $I_1$ and the emission intensity $I_0$. At 707, a radial position shift Δr is determined based on the extinction value $E_\lambda$. At 708, a radial distance r of LED is determined based on the reference distance $r_0$ and the radial position shift Δr. In this way, a 3D position (r, θ, φ) of the LED is obtained.

The process of associating a pixel cluster $\mathbb{C}$ with a specific LED and a reference intensity $I_0$ and a reference distance $r_0$ predefined for this LED, it may for example be applied a tracking of pixels and pixel clusters such as described in the scientific paper "Detect to track and track to detect" by Feichtenhofer, Christoph, Axel Pinz, and Andrew Zisserman published in Proceedings of the IEEE International Conference on Computer Vision. 2017 may be used or the teachings of the scientific paper "Multi-object Detection and Tracking (MODT) Machine Learning Model for Real-Time Video Surveillance Systems", by Elhoseny, Mohamed, published in Circuits, Systems, and Signal Processing 39.2 (2020): 611-630.

In another embodiment frequency modulation can be used to track the LEDs.

In FIG. 7, the 3D position (r, θ, φ) of the LED is expressed in spherical coordinates with respect to an origin (centrum of the lens system of the camera), where r describes the radial distance of the LED from the origin, and θ describes a polar angle with respect to a fixed and (arbitrarily) predefined zenith direction, and φ describes an azimuth angle, i.e. an orthogonal projection of the position of the LED on a reference plane that passes through the origin and is orthogonal to the zenith, measured from a (arbitrarily) fixed reference direction on that plane.

Aspects of this process are described in more detail with reference to FIG. 8, whereby, for sake of clarity, the description is reduced to two dimensions, namely radial distance r, and polar angle θ.

FIG. 8 schematically shows a path of a light beam travelling within the light-absorbing interior part of the deformable object 100 of FIG. 2. FIG. 8 shows (as well as FIG. 2) a part of the cross section through the x-z-plane of the deformable object 100. A LED 204a is attached to the inner surface of the outer part 102 and emits light for example in the visible or NIR wavelength range.

The light emitted by LED 204a travels through light-absorbing dye and is then focused onto a camera sensor 201a by a lens system 202a at a distance $b_x$ from the optical axis 802 of the lens system 202a. The lens system 202a is defined by a lens plane 801 (main plane) and an optical axis 802 which is orthogonal to the main plane 801. The intersection of the main plane 801 and the optical axis 802 is here denoted as centre of the lens system and is treated as origin of a polar coordinate system. With single thin lenses, the main plane can be approximated by the lens centre. The image distance a describes the distance between the image produced by the optical lens 202a on the sensor 201a and the main plane 801 along the optical axis 802.

It shall be noted that in the schematic example of FIG. 8 the focus of the description is on a central beam of light passing through the centre of the lens system. However, as indicated by the dotted lines, the LED 204a may emit light in an several directions (for example at a radiation angle of 45°) which is all focused onto the camera sensor 201a.

The radial distance r of the LED is the distance between the light emitting LED 204a and the origin (centrum of the lens system 202a).

On its way from the LED 204a through the light-absorbing dye to the camera sensor, the LED light is gradually absorbed by homogeneously dissolved light-absorbing dye located in the deformable object 100 so that the intensity of the light decreases to a measured intensity $I_1$, which is captured at the camera sensor 201a as described with regard to FIG. 6 above.

If the deformable object is deformed, the position of the LED changes.

In FIG. 8, the reference sign 204a' denotes the LED 204a in a reference position in which a calibration measurement has been performed by determining a (radial) reference position $r_0$ of the LED which defines a predefined radial distance of the LED in a predefined reference position at which the LED 204a is located when the deformable object is in a predefined reference shape, and by determining a reference intensity $I_0$ of a pixel cluster (see C in FIG. 6) that relates to light from LED arriving on the camera sensor 201a when the LED 204a is in its reference position 204a'.

When the deformable object 100 is deformed by some external forces, the LED moves from the reference position 204a to a new position 204a'. In the example of FIG. 8, a radial position shift Δr emerging from this movement is described. The radial position shift Δr results in that the light of the LED has to pass through more or less of the light-absorbing dye located in the deformable object 100. As a result, in the deformed state, the intensity $I_1$ of light captured on the sensor 201a is smaller, respectively larger than the intensity $I_0$ of light captured on the sensor 201a when the LED 204a is in its reference position.

The radial position shift Δr can be determined based on the Lambert-Beer law (see FIG. 9 and corresponding description) from a measured intensity $I_1$, the predetermined reference intensity $I_0$ and by knowing the molar attenuation coefficient $\epsilon_\lambda$ of the (organic) light-absorbing dye at wavelength λ with given concentration c of the light-absorbing dye:

$$\Delta r = \frac{E_\lambda}{\epsilon_\lambda} \cdot c = \left(\log_{10}\frac{I_0}{I_1}\right) / \epsilon_\lambda \cdot c$$

where $$E_\lambda = \log_{10}\frac{I_0}{I_1}$$

is an extinction value at wavelength λ that is related to the position shift Δr.

For the sake of illustration, it is assumed here, that the LED 204a emits light at a specific wavelength λ and that $\epsilon_\lambda$ is the molar attenuation coefficient $\epsilon_\lambda$ at this predefined wavelength λ. The skilled person can however adapt the teaching presented here to cases where LED 204a transmits light at multiple wavelengths λ by considering a known wavelength-dependency of the molar attenuation coefficient.

The radial position of the LED 204a after position shift Δr can thus be obtained from the predefined reference distance $r_0$ as:

$$r = r_0 + \Delta r = r_0 + \left(\log_{10}\frac{I_0}{I_1}\right) / \epsilon_\lambda \cdot c$$

An incident angle θ which is indicative of the polar direction of LED 204a with respect to the lens system 801 may be determined from the position $b_x$ of the pixel cluster on the sensor 201a as $$\theta = \arctan\left(\frac{b}{a}\right).$$

where a is the predefined image distance of the lens system 202a which is known as a configuration parameter of the lens system 202a.

With the same process as described with regards FIG. 8 (cross section through the x-z plane) an azimuth angle φ may be determined with regard to a cross section through the y-z plane, that is based on the position $b_y$ of the pixel cluster on the image sensor 201a.

The tuple (r, θ, φ) is 3D spherical coordinate of the light emitting LED 204a that is associated with the pixel object on the camera sensor. This 3D spherical coordinate (r, θ, φ) can be transformed into a global coordinate system (e.g. cartesian coordinate system) by coordination transformations which are well known to the skilled person. The transformation from a camera coordinate system to the global coordinate system can be performed for each respective camera coordinate system separately in order to perform sensor fusion of the data obtained from each of the camera sensors. That is, this process as described above may be applied to each of the plurality of the LEDs and images obtained from all camera sensors which results in that all received 3D coordinates are transformed into same global coordinate system.

Based on the 3D coordinates of the LEDs, the shape of the object 100 is reconstructed. The shape of the object 100 may for example be defined by collecting the received coordinates of the plurality of LEDs (or plurality of reflection points of the plurality of LEDs in the reflective layer 306) in a set of 3D coordinates that describes the shape of the object. Optionally, interpolation techniques such as surface spline interpolation or the like may be applied to the of set of 3D coordinates that describes the shape of the object in order to define the shape of the object.

The same principle as explained with regard to FIG. 7 applies to a deformable object 100 with optical shape recognition as described in the embodiment with regard to FIG. 3. In this case a radial position shift Δr results in 2Δr light path alteration.

Figure 9:
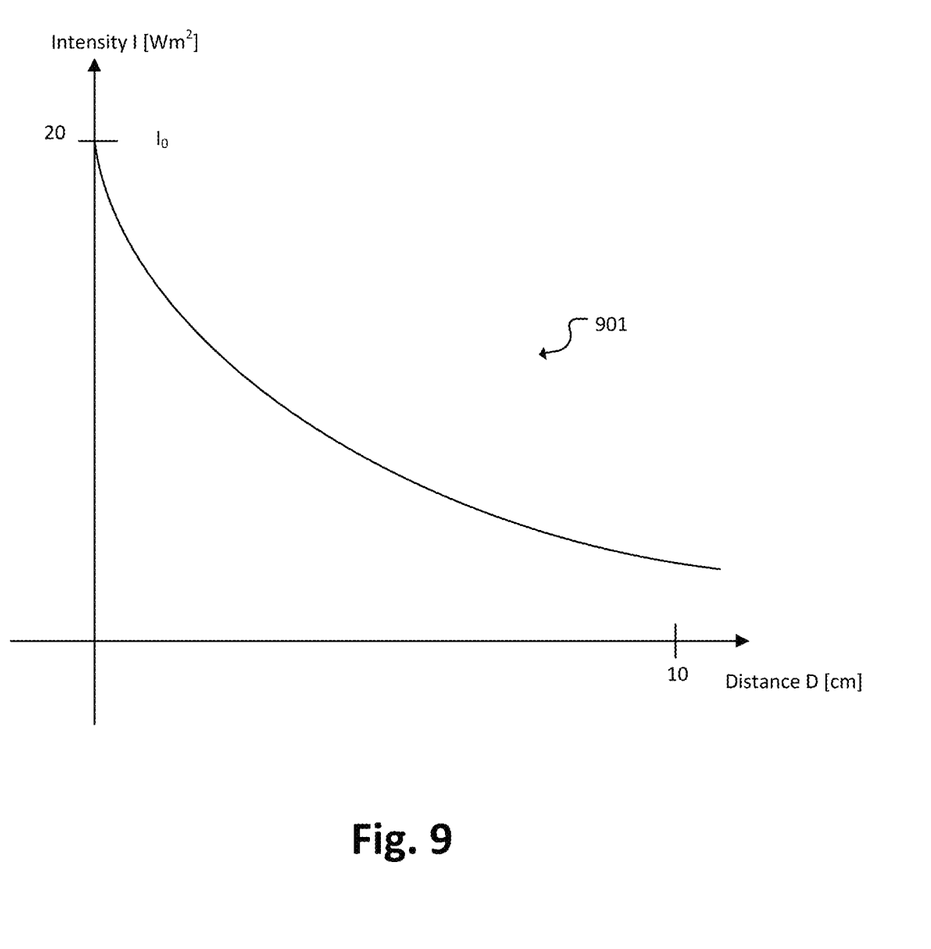
FIG. 9 schematically shows the Lambert-Beer law which is used to determine a light travelling distance within the light-absorbing interior part of the deformable object 100.

FIG. 9 schematically shows the Lambert-Beer law which is used in the embodiments to determine a light travelling distance within the light-absorbing interior part of the deformable object 100.

According to the Lambert-Beer law, the extinction $E_\lambda$ (absorbance of the light-absorbing dye for light of the wavelength λ) is given by $$E_\lambda = \log_{10}\frac{I_0}{I_1} = \epsilon_\lambda \cdot c \cdot d$$

where $I_0$ is the intensity of the incident (radiated) light, expressed for example in $W \cdot m^{-2}$, $I_1$ is the intensity of transmitted light expressed for example in $W \cdot m^{-2}$, c is the concentration of the light-absorbing dye, $\epsilon_\lambda$ is the molar attenuation coefficient (or absorptivity) of the light-absorbing dye at a wavelength λ (for example NIR wavelength), and d (also called optical path) is the layer thickness of the material, expressed for example in meters. If the concentration is given in moles, $\epsilon_\lambda$ is given as the decadal molar extinction coefficient, for example in the unit $m^2 \cdot mol^{-2}$.

Graph 901 schematically shows a function which maps the layer thickness (distance d that a light beam travels through a light-absorbing dye), and the extinction $E_\lambda$ that occurs along this travelled distance d in the light-absorbing dye.

Implementation

Figure 10:
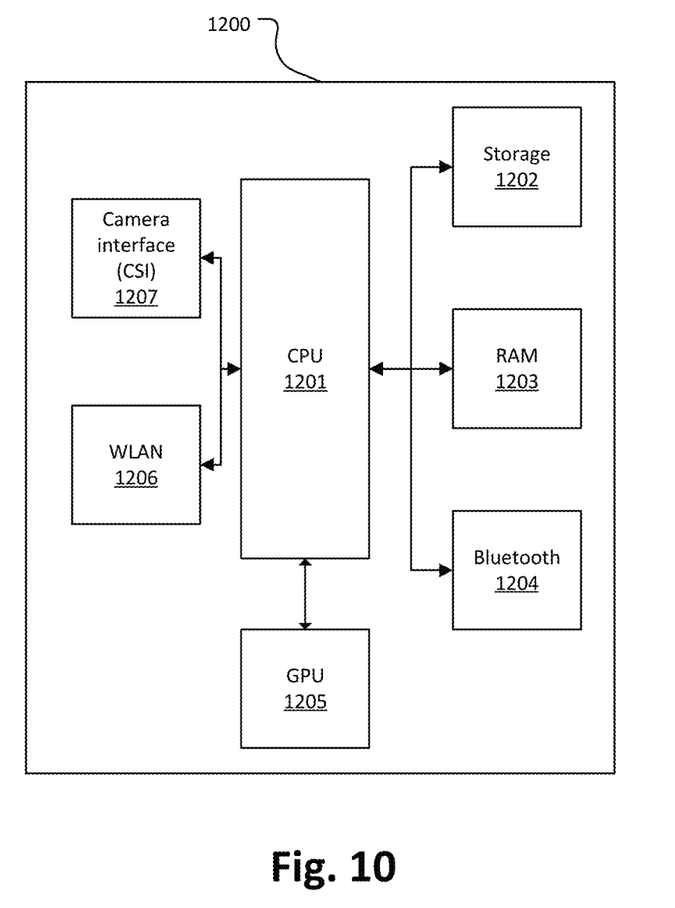
FIG. 10 schematically describes an embodiment of an electronic device which may implement the functionality of a controlling or processing of an optical shape recognition.

FIG. 10 schematically describes an embodiment of an electronic device which may implement the functionality of a controlling or processing an optical shape recognition. The electronic device 1200 may control the illumination of the inside a deformable object and control the capturing of an image of the inside of the object and process the captured image and reconstruct a shape of the object. The electronic device 1200 may also implement the functionality of a processor which received a capture image to reconstruct a shape of the object. The electronic device 1200 comprises a CPU 1201 as processor. The electronic device 1200 further comprises a GPU 1205. The electronic system 1200 further comprises a Camera Serial Interface (CSI) interface 1207 which connects the camera sensors or photodiode to the processor 1201. The CSI interface may be a specification of the Mobile Industry Processor Interface (MIPI) Alliance and may a specified as CSI-2 v3.0, CSI-3 v1.1 or CCS v1.0 or the like. The electronic system 1200 further comprises a Bluetooth 1204 and WLAN 1206 module to receive or sent data from/to external devices. The electronic device 1200 further comprises a data storage 1202 and a data memory 1203 (here a RAM). The data memory 1203 is arranged to temporarily store or cache data or computer instructions for processing by the processor 1201. The data storage 1202 is arranged as a long-term storage, e.g., for recording images, or coordinates of a reconstructed shape of an object.

It should be recognized that the embodiments describe methods with an exemplary ordering of method steps. The specific ordering of method steps is, however, given for illustrative purposes only and should not be construed as binding.

It should also be noted that the division of the electronic device of FIG. 10 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An electronic device comprising a deformable object (100) which is at least partially filled with a light-absorbing material, one or more light sources (204; 304; 403) configured to illuminate the inside of the deformable object (100), an imaging unit (103) configured to capture respective images ($\mathbb{C}$) of the light sources (204; 304; 403), and circuitry configured to reconstruct the shape of the deformable object (100) based on the captured images ($\mathbb{C}$) of the light sources (204; 304; 403).

(2) The electronic device of (1), wherein the circuitry is configured to determine from the images ($\mathbb{C}$) of the light sources (204; 304; 403) respective positions (r, θ, φ) of the light sources (204; 304; 403) and to determine the shape of the deformable object (100) based on the positions (r, θ, φ) of the light sources (204; 304; 403).

(3) The electronic device of (1) or (2), wherein the circuitry is configured to determine an intensity ($I_1$) of an image ($\mathbb{C}$) of a light source (204; 304; 403) captured by an image sensor (601), and to determine a radial position (r) of the light source (204; 304; 403) based on the intensity ($I_1$).

(4) The electronic device of (3), wherein the circuitry is configured to determine a position shift (Δr) related to a light source (204; 304; 403) based on the intensity ($I_1$) of the image ($\mathbb{C}$) of the light source (204; 304; 403).

(5) The electronic device of (4), wherein the circuitry is configured to determine an extinction value ($E_\lambda$) based on the intensity ($I_1$) of the image ($\mathbb{C}$) of the light source (204; 304; 403), and to determine the position shift (Δr) based on the extinction value ($E_\lambda$).

(6) The electronic device of (5), wherein the circuitry is configured to determine the extinction value ($E_\lambda$) according to $$E_\lambda = \log_{10} \frac{I_0}{I_1}$$

where $I_1$ is the intensity of the image ($\mathbb{C}$) of the light source (204; 304; 403), and where $I_0$ is a reference intensity.

(7) The electronic device of anyone of (4) to (6), wherein the light-absorbing material comprises a light-absorbing dye distributed within the deformable object (100), and wherein the circuitry is configured to determine a radial position shift (Δr) of the light source (204; 304; 403) based on the intensity ($I_1$) of the image ($\mathbb{C}$) of the light source (204; 304; 403) according to $$\Delta r = \left(\log_{10} \frac{I_0}{I_1}\right) / \epsilon_\lambda \cdot c$$

where $\epsilon_\lambda$ is the molar attenuation coefficient of a light-absorbing dye at wavelength λ, and c is the concentration of a light-absorbing dye distributed within the deformable object (100).

(8) The electronic device of anyone of (4) to (7), wherein the circuitry is configured to determine the radial position (r) of the light source (204; 304; 403) based on the position shift (Δr) and a reference position ($r_0$).

(9) The electronic device of anyone of (1) to (8), wherein the circuitry is configured to determine a position ($b_x$, $b_y$) of an image ($\mathbb{C}$) of a light source (204; 304; 403) on an image sensor (601) and to determine a direction (θ, φ) of the light source (204; 304; 403) based on this position ($b_x$, $b_y$).

(10) The electronic device of anyone of (1) to (9), wherein the light sources (204; 304; 403) are embedded in the deformable object (100).

(11) The electronic device of anyone of (1) to (10), wherein the circuitry is configured to reconstruct the shape of the object (100) by reconstructing a 3D position (r, θ, φ) for each of the light sources (204; 304; 403).

(12) The electronic device of anyone of (2) to (11), wherein the circuitry is further configured to reconstruct a shape of the object (100) based on an interpolation through positions (r, θ, φ) of the light sources (204; 304; 403).

(13) The electronic device of anyone of (1) to (12), wherein the imaging unit (103) is located inside the object (100).

(14) The electronic device of anyone of (1) to (13), wherein the imaging unit (103) comprises a plurality of camera sensors (201) and lens systems (202) to capture a 360° angle of view.

(15) The electronic device of anyone of (1) to (14), wherein the light sources (204) are placed at the inner side of an outer part (102) of the object (100).

(16) The electronic device of anyone of (1) to (15), wherein the light sources (304; 403) are placed inside the object (100) to illuminate a reflective layer (306) of the deformable object (100).

(17) The electronic device of anyone of (1) to (16), wherein the light sources (204; 304; 403) are LEDs.

(18) The electronic device of anyone of (1) to (17), wherein an interior part (101) of the deformable object (100) comprises a non-scattering, flexible, elastic and/or non-compressible polymer in combination with a homogeneously dissolved light-absorbing dye.

(19) The electronic device of anyone of (1) to (18), wherein the outer part (102) of the object (100) comprises a flexible, stretchable and/or plastic material.

(20) A method comprising illuminating the inside of a deformable object (100) which is at least partially filled with a light-absorbing material, capturing respective images ($\mathbb{C}$) of the light sources (204; 304; 403), and reconstructing the shape of the deformable object (100) based on the captured images ($\mathbb{C}$) of the light sources (204; 304; 403).

The invention claimed is:

1. An electronic device comprising
   a deformable object which is at least partially filled with a light-absorbing material,
   one or more light sources embedded in the deformable object, the one or more light source being configured to illuminate the inside of the deformable object,
   an image detector inside the deformable object, the image detector being configured to capture respective images of light emitted by the light sources and traversing the inside of the deformable object, and
   circuitry configured to reconstruct the shape of the deformable object based on the captured images.

2. The electronic device of claim 1, wherein the circuitry is configured to determine from the images of the light sources respective positions of the light sources and to determine the shape of the deformable object based on the positions of the light sources.

3. The electronic device of claim 2, wherein the circuitry is further configured to reconstruct a shape of the object based on an interpolation through positions of the light sources.

4. The electronic device of claim 1, wherein the circuitry is configured to determine an intensity of an image of a light source captured by the image detector, and to determine a radial position of the light source based on the intensity.

5. The electronic device of claim 4, wherein the circuitry is configured to determine a position shift related to a light source based on the intensity of the image of the light source.

6. The electronic device of claim 5, wherein the circuitry is configured to determine an extinction value based on the intensity of the image of the light source, and to determine the position shift based on the extinction value.

7. The electronic device of claim 6, wherein the circuitry is configured to determine the extinction value according to $$E_\lambda = \log_{10} \frac{I_0}{I_1}$$

where $I_1$ is the intensity of the image of the light source, and where $I_0$ is a reference intensity.

8. The electronic device of claim 5, wherein the light-absorbing material comprises a light-absorbing dye distributed within the deformable object, and wherein the circuitry is configured to determine a radial position shift of the light source based on the intensity of the captured images according to $$\Delta r = \left(\log_{10} \frac{I_0}{I_1}\right) \Big/ \epsilon_\lambda \cdot c$$

where $\epsilon_A$ is the molar attenuation coefficient of a light-absorbing dye at wavelength $\lambda$, and c is the concentration of a light-absorbing dye distributed within the deformable object.

9. The electronic device of claim 5, wherein the circuitry is configured to determine the radial position of the light source based on the position shift and a reference position.

10. The electronic device of claim 1, wherein the circuitry is configured to determine a position of an image of a light source on the image detector and to determine a direction of the light source based on this position.

11. The electronic device of claim 1, wherein the circuitry is configured to reconstruct the shape of the object by reconstructing a 3D position for each of the light sources.

12. The electronic device of claim 1, wherein the image detector comprises a plurality of camera sensors and lens systems to capture a 360° angle of view.

13. The electronic device of claim 1, wherein the light sources are placed at an inner side of an outer part of the deformable object.

14. The electronic device of claim 1, wherein the light sources are placed inside the deformable object to illuminate a reflective layer of the deformable object.

15. The electronic device of claim 1, wherein the light sources are LEDs.

16. The electronic device of claim 1, wherein an interior part of the deformable object comprises a non-scattering, flexible, elastic and/or non-compressible polymer in combination with a homogeneously dissolved light-absorbing dye.

17. The electronic device of claim 1, wherein an outer part of the deformable object comprises a flexible, stretchable and/or plastic material.

18. A method comprising
    illuminating the inside of a deformable object with light from one or more light sources embedded in the deformable object, wherein the deformable object is at least partially filled with a light-absorbing material,
    capturing respective images of light emitted by the light sources and traversing the inside of the deformable object with an image detector inside the deformable object, and
    reconstructing the shape of the deformable object based on the captured images.

* * * * *